US008387381B2

(12) United States Patent
Ohno et al.

(10) Patent No.: US 8,387,381 B2
(45) Date of Patent: Mar. 5, 2013

(54) ELECTRIC BOOSTER

(75) Inventors: Takayuki Ohno, Minami Alps (JP);
Takuya Obata, Minami Alps (JP);
Daisuke Yasukawa, Hitachinaka (JP);
Hirofumi Watanabe, Tsuchiura (JP)

(73) Assignee: Hitachi, Ltd., Tokyo (JP)

( * ) Notice: Subject to any disclaimer, the term of this patent is extended or adjusted under 35 U.S.C. 154(b) by 938 days.

(21) Appl. No.: 12/361,138

(22) Filed: Jan. 28, 2009

(65) Prior Publication Data

US 2009/0217659 A1    Sep. 3, 2009

(30) Foreign Application Priority Data

Jan. 31, 2008  (JP) .................................. 2008/21645

(51) Int. Cl.
*F15B 7/00*    (2006.01)
(52) U.S. Cl. .......................................................... 60/545
(58) Field of Classification Search .................... 60/538, 60/545
See application file for complete search history.

(56) References Cited

U.S. PATENT DOCUMENTS

| 4,812,723 | A  | * | 3/1989  | Shimizu ......................... | 60/545 |
| 4,918,921 | A  | * | 4/1990  | Leigh-Monstevens et al. | 60/545 |
| 5,607,207 | A  | * | 3/1997  | Nagashima et al. ............ | 60/545 |
| 8,011,184 | B2 | * | 9/2011  | Ohtani et al. ................... | 60/545 |
| 8,096,122 | B2 | * | 1/2012  | Ikeda et al. ..................... | 60/545 |
| 2008/0302100 | A1 | | 12/2008 | Ohtani et al. | |

FOREIGN PATENT DOCUMENTS

| JP | 2007-187262 | 7/2007 |
| JP | 2007-191133 | 8/2007 |
| JP | 2008-302725 | 12/2008 |

OTHER PUBLICATIONS

International Search Report (in English language) issued in International (PCT) Application No. PCT/JP2009/063884 on Nov. 17, 2009.
Patent Cooperation Treaty (PCT) Written Opinion of the International Searching Authority (in English language) issued in International Application No. PCT/JP2009/063884 on Nov. 17, 2009.
Patent Cooperation Treaty (PCT) International Preliminary Report on Patentability (in English language) issued in International Application No. PCT/JP2009/063884 on Mar. 13, 2012.

* cited by examiner

*Primary Examiner* — Michael Leslie
(74) *Attorney, Agent, or Firm* — Wenderoth, Lind & Ponack, L.L.P.

(57) ABSTRACT

The present invention relates to an electric booster in which a rotation of an electric motor is converted into a linear motion and transmitted to an output member by a rotation-linear motion mechanism, and the output member pushes a piston of a master cylinder to generate a brake fluid pressure in a pressure chamber in the master cylinder. The present invention is characterized in that an ECU casing containing boards and the like such as a board for controlling the electric motor is coupled to the top of a motor casing constituting the electric motor. The ECU casing is offset in one direction in a plane perpendicular to a plane containing an axis of the master cylinder. A male connector is provided at a side surface of the ECU casing on the opposite side from the offset direction F side, and a space between the male connector and an interference area of the ECU casing with the other components and devices is utilized as a space for attachment/detachment of the male connector to/from the female connector.

19 Claims, 8 Drawing Sheets

ELECTRIC BOOSTER

BACKGROUND OF THE INVENTION

The present invention relates to a booster for use in a brake system of a vehicle. In particular, the present invention relates to an electric booster using an electric motor as a boosting source.

Examples of conventional electric boosters include the invention disclosed in Japanese Patent Public Disclosure 2007-191133, in which the electric motor is actuated in response to an actuation instruction, the rotation of the electric motor is converted into a linear motion and transmitted to the output member by the rotation-linear motion converting mechanism, and the output member thrusts the piston of the master cylinder to generate a brake fluid pressure in the pressure chamber in the master cylinder.

In the electric booster disclosed in the above-mentioned Japanese Patent Public Disclosure 2007-191133, since the ECU (control device) for controlling the electric motor is provided as a separate body from the electric booster, the electric booster and the ECU should be connected with each other after they are installed onto the vehicle (after installment into the engine room), which would be definitely a difficult and annoying work.

SUMMARY OF THE INVENTION

The present invention has been contrived in consideration of the above-mentioned conventional problem, and an object thereof is to provide an electric booster and an ECU as an integrated body so as to make it easy to install them onto a vehicle. Another object is to provide an electric booster in which interference and contact with the other components and devices in an engine room can be reduced.

In order to achieve the forgoing and other objects, in the present invention, an ECU casing containing an ECU board for controlling an electric motor is integrally formed with a motor casing of the electric motor. The ECU casing is disposed so as to be offset in one direction in a plane perpendicular to a plane containing an axis of a master cylinder. A connector for supplying at least a power source to the board and the like is provided at an end of the ECU casing on the side where the ECU casing is offset, or an opposite side from the side where the ECU casing is offset.

DETAILED DESCRIPTION OF THE INVENTION

Figure 1:
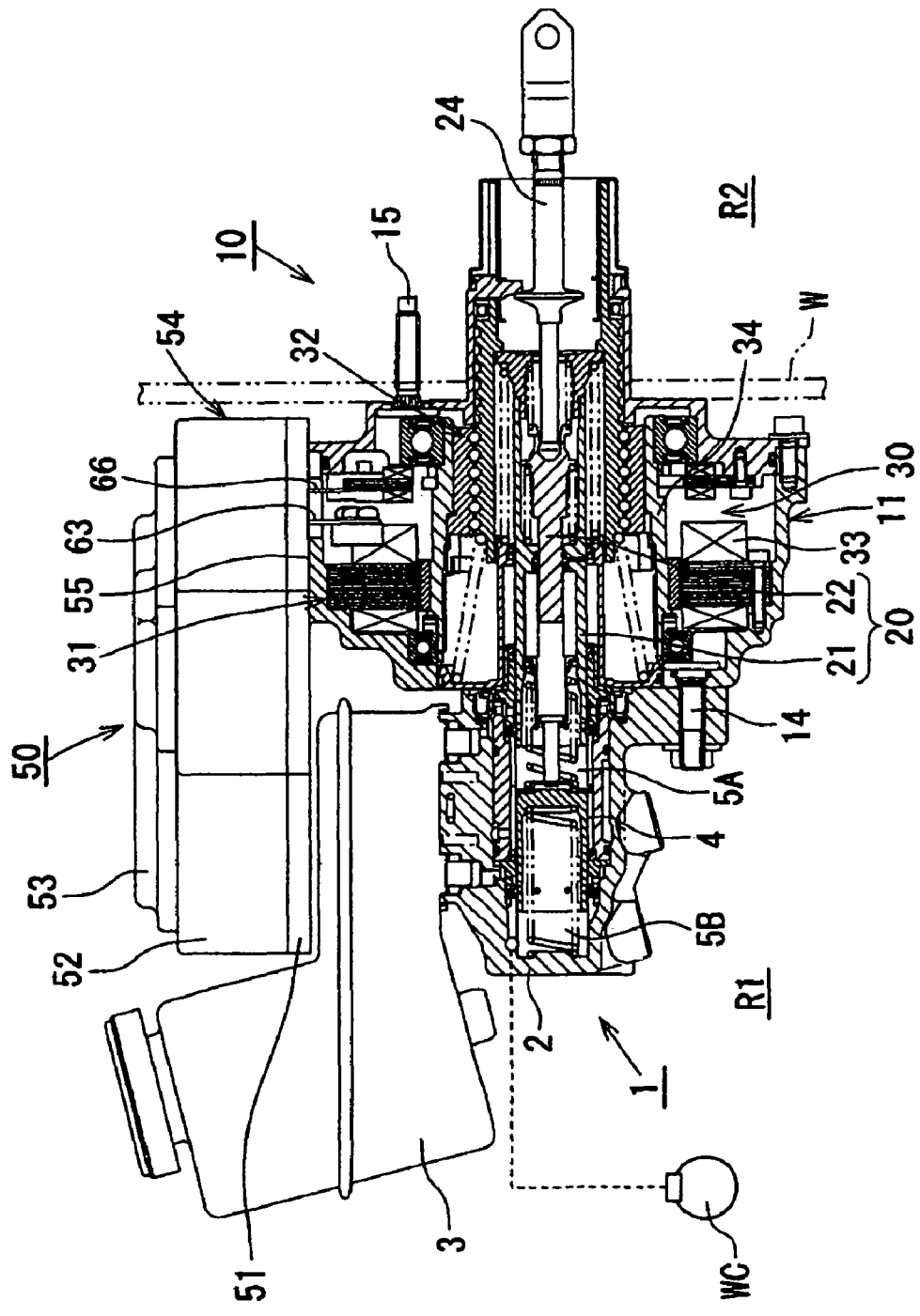
FIG. 1 is a cross-sectional view illustrating an overall structure of an electric booster according to a first embodiment of the present invention.
Figure 2:
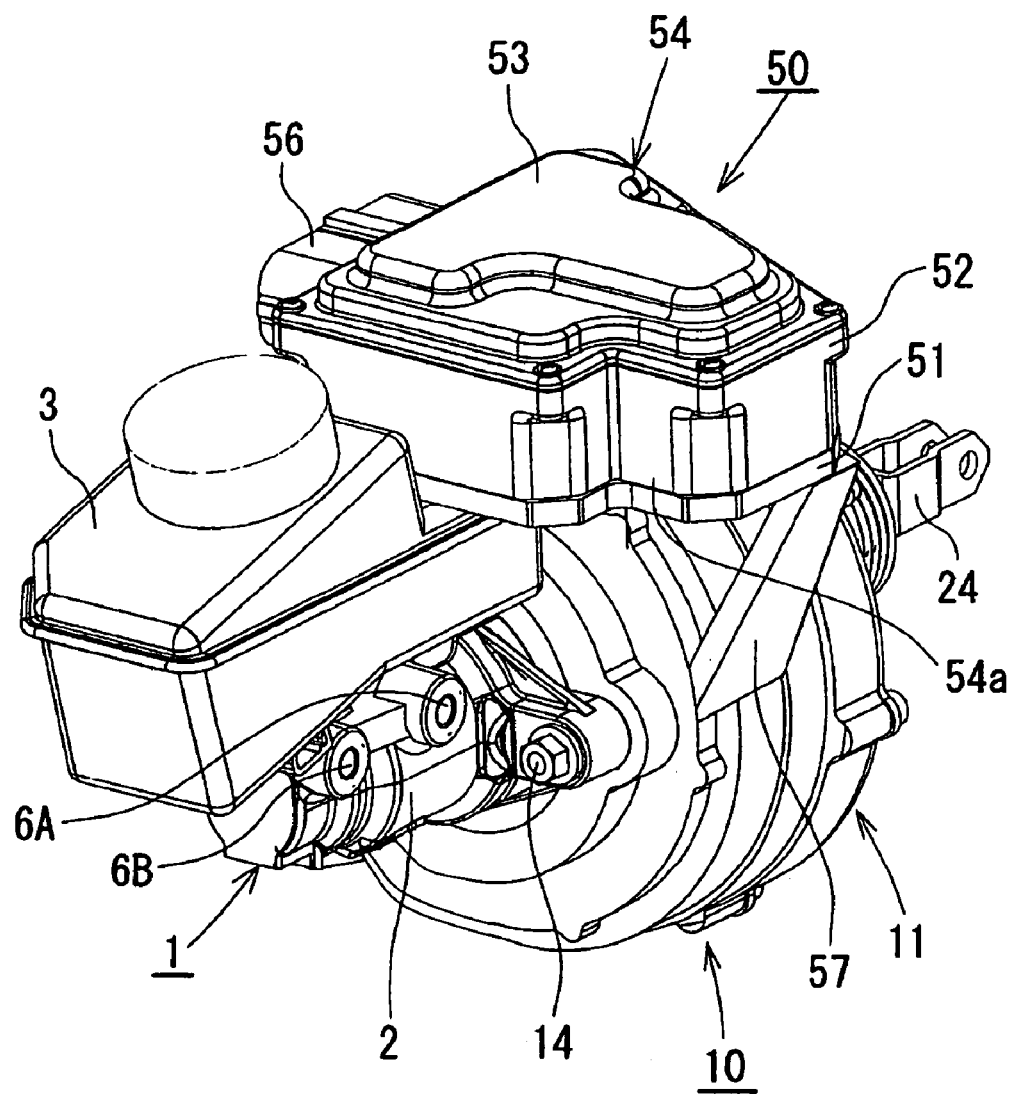
FIG. 2 is a perspective view illustrating the overall structure of the electric booster according to the first embodiment of the present invention.

Hereinafter, preferred embodiments of the present invention will be described with reference to the accompanying drawings.

FIGS. 1 to 4 show a structure of an electric booster according to a first embodiment of the present invention. An electric booster 10 has one end fixed to a partition wall W separating an engine room R1 and a vehicle compartment R2, and the other end comprising a casing 11. A tandem master cylinder, which will be described later, is coupled to the casing 11.

Hereinafter, for convenience of description, the side of the engine room R1 is referred to as "front side", and the side of the vehicle compartment side R2 is referred to as "rear side".

The casing 11 comprises a cylindrical casing body 12, and a rear cover 13 fixed to the rear end of the casing body 12 by a bolt. A stepped front wall 12a is integrally formed at the front end of the casing body 12. The tandem master cylinder 1 is fixedly coupled to the front wall 12a by a stud bolt 14. The rear cover 13 is fixedly coupled to the partition wall W by a stud bolt 15. While the components are fixed in this way, a cylindrical boss portion 13a integrally formed with the rear cover 13 extends into the vehicle compartment R2 through the partition wall W.

The casing 11 of the electric booster 10 contains a piston assembly 20 and an electric actuator 30. As will be described later, the piston assembly 20 also serves as a primary piston of the tandem master cylinder 1. As will be described later, the electric actuator 30 is operable to actuate a booster piston 21 (output member) which is one of the components of the piston assembly 20. A controller (ECU) 50, which will be described later, is integrally formed on the top of the casing 11 (casing body 12) for controlling actuation of the electric actuator 30.

As shown in FIG. 1, the tandem master cylinder (hereinafter referred to as just "master cylinder") 1 comprises a bottomed cylinder body 2 and a reservoir 3. A secondary piston 4, which makes a pair with the piston assembly 20 as the primary piston, is slidably disposed on the bottom side of the cylinder body 2. Two pressure chambers 5A and 5B are defined in the cylinder body 2 by the piston assembly 20 and the secondary piston 4. As the pistons 20 and 12 advance, brake fluid contained in the pressure chambers 5A and 5B is pumped from discharge ports 6A and 6B formed at the cylinder body 2 into a wheel cylinder WC of the associated brake system.

Further, relief ports 7A and 7B are formed at the cylinder body 2 for connecting the reservoir 3 to the insides of the pressure chambers 5A and 5B. A pair of seal members 8A and 8B are disposed on the inner surface of the cylinder body 2 so that the relief ports 7A and 7B are respectively sandwiched by the seal members 8A and 8B. Return springs 9A and 9B are respectively disposed in the pressure chambers 5A and 5B for constantly urging backward the piston assembly 20 as the primary piston and the secondary piston 4. When the pistons 20 and 12 are at their respective backward ends, the pressure chambers 5A and 5B are in communication with the reservoir 3 through the relief ports 7A and 7B so that necessary brake fluid is supplied from the reservoir 3 into the pressure chambers 5A and 5B.

Figure 3:
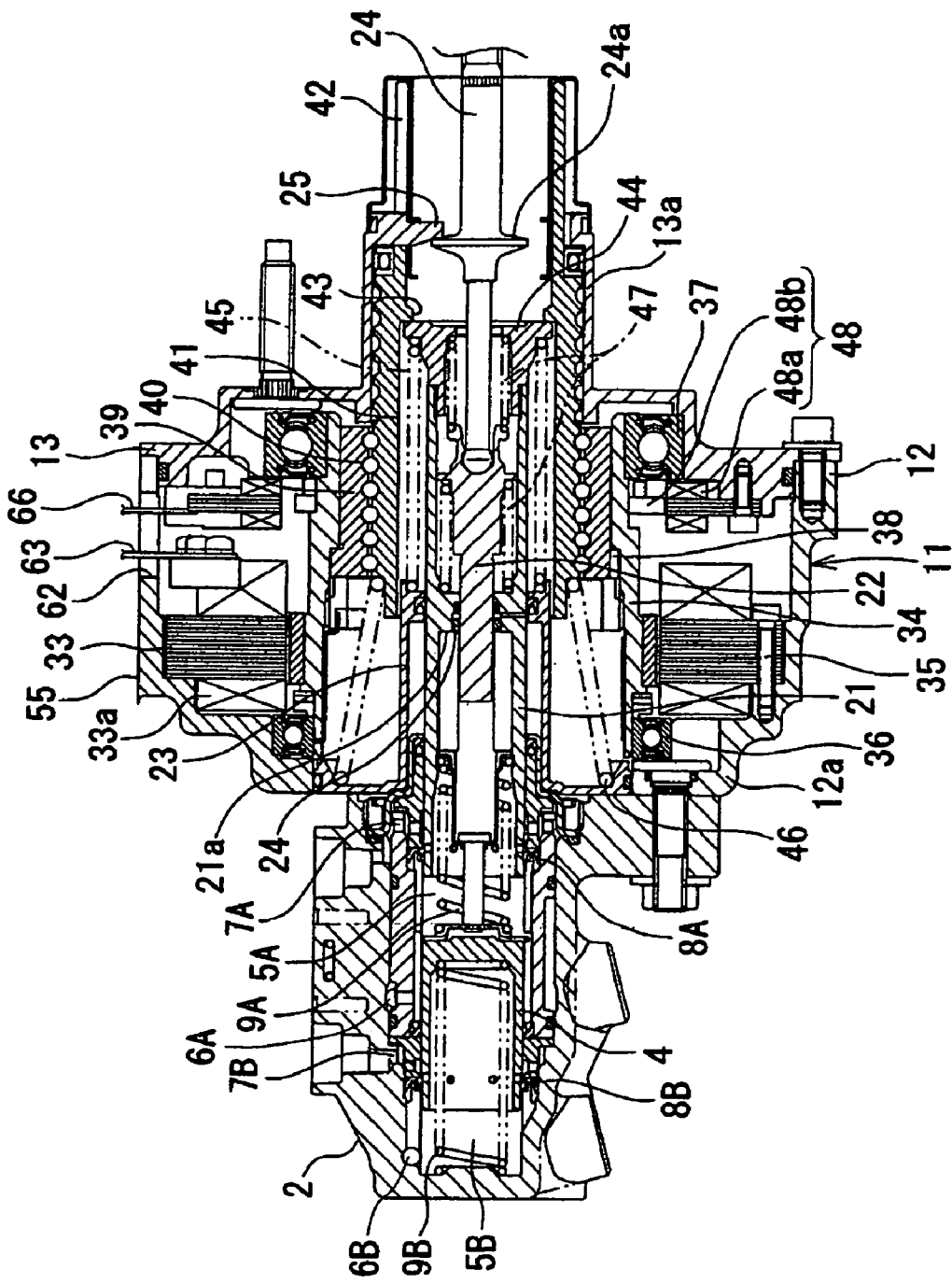
FIG. 3 is a cross-sectional view illustrating a structure of the main portion of the electric booster according to the first embodiment.

The piston assembly 20 comprises the booster piston 21 and an input piston 22. The solid input piston 22 is disposed in the cylindrical booster piston 21 so as to be movable relative to the booster piston 21. As shown in FIG. 3, the booster piston 21 is slidably fitted through a cylindrical guide 23 fittedly attached to the front wall 12a at the front end of the casing body 12. The front end of the booster piston 21 extends into the pressure chamber (primary chamber) 5A of the master cylinder 1. On the other hand, the input piston 22 is slidably fitted through an annular wall portion 21a formed on the inner circumferential surface of the booster piston 21. The front end of the input piston 22 also extends into the primary chamber 5A of the master cylinder 1. The seal member 8A provides a seal between the booster piston 21 and the cylinder body 2 of the master cylinder 1, and a seal member 24 disposed at the annular wall portion 21a provides a seal between the booster piston 21 and the input piston 22. In this way, brake fluid is prevented from leaking from the primary chamber 5A to the outside of the master cylinder.

Referring to the rear end of the input piston 22, the tip of an input rod 24 adapted to move according to a movement of a brake pedal (not shown) is rotatably coupled to the rear end of the input piston 22. Due to this configuration, the input piston 22 can move forward and backward in the booster piston 21 in response to an operation of the brake pedal (pedal operation). An enlarged diameter portion 24a is integrally formed at an intermediate position of the input rod 24. A backward movement (movement toward the vehicle compartment R2 side) of the input rod 24 is limited by abutment of the enlarged diameter portion 24a against an inner protrusion 25 integrally formed at the rear end of the cylindrical boss portion 13a of the rear cover 13. That is, the backward end of the input piston 22 is the position of the input piston 22 when the flange portion 24a of the input rod 24 abuts against the inner protrusion 25 of the rear cover 13.

The electric actuator 30 comprises an electric motor 31 and a ball screw mechanism 32 (rotation-linear motion converting mechanism) operable to convert a rotation of the electric motor 31 into a linear movement and transmit it to the booster piston 21. The electric motor 31 comprises a stator 33 including a plurality of coils 33a, and a hollow rotor 34 adapted to rotate by application of an electric current to the stator 33. The stator 33 is fixed to the casing body 12 by a bolt 35. The rotor 34 is rotatably supported relative to the casing body 12 and the rear cover 13 via bearings 36 and 37. Therefore, in the present embodiment, the casing 11 is configured to also serve as a motor casing. It should be note that hereinafter the casing 11 is also referred to as "motor casing 11".

The ball screw mechanism 32 comprises a nut member 39 non-rotatably fittedly fixed to the rotor 34 of the electric motor 31 by a key 38, and a hollow screw shaft 41 (linearly moving member) meshed with the nut member 39 via balls 40. An axially extending slit 42 is formed on the rear end of the screw shaft 41, and the inner protrusion 25 of the rear cover 13 is inserted in the slit 142. That is, the screw shaft 41 is arranged so that it cannot rotate in the casing 11. Since the screw shaft 141 is non-rotatable in this way, when the nut member 39 rotates integrally with the rotor 34, the screw shaft 41 performs a linearly reciprocating movement along the axial direction of the electric booster 10.

On the other hand, an annular protrusion 43 is formed on the inner surface of the screw shaft 41. The annular protrusion 43 is configured to abut against a flange member 44 screwed into the rear end of the booster piston 21. A return spring 45 (urging unit) is disposed between the flange member 44 and the cylindrical guide 23 fitted to the casing body 12. The flange member 44 of the booster piston 21 constantly keeps abutting against the annular protrusion 43 of the screw shaft 41 with the aid of the return spring 45. Therefore, as the screw shaft 41 moves forward in response to a rotation of the nut member 39, the booster piston 21 also moves forward by being pushed by the screw shaft 41. In the present embodiment, while the brake is not in operation, the position of the screw shaft 41 is determined to the backward end thereof by abutment of the start end of the slit 42 against the inner protrusion 25 of the rear cover 13. Accordingly, the position of the booster piston 21, while the brake is not in operation, is also determined to the backward end thereof by abutment of the flange member 44 against the annular protrusion 43 of the screw shaft 41 positioned at the backward end thereof. A holding spring 46 is disposed between the screw shaft 41 and the cylindrical guide 23 for urging backward the screw shaft 41 and preventing an accidental forward movement of the screw shaft 41.

As best shown in FIG. 3, a pair of balance springs 47 (urging units) are disposed between the booster piston 21 and the input piston 22 of the piston assembly 20. The pair of balance springs 47 serve to maintain the booster piston 21 and the input piston 22 at their neutral positions of relative displacement while the brake is not in operation.

In the present embodiment, a potentiometer (not shown) is disposed at a fixed portion in the vehicle compartment R2 for detecting an absolute displacement of the input piston 22 relative to the vehicle body based on a movement of the input rod 24 (or the brake pedal). Further, a resolver 48 (rotation sensor) is disposed in the casing 11 for detecting an absolute displacement of the booster piston 21 relative to the vehicle body based on a rotational displacement of the electric motor 31. The resolver 48 comprises a resolver stator 48a attached to the casing 11 (the casing body 12) by a bolt, and a resolver rotor 48b disposed around an outer circumferential surface of the rotor 34 of the electric motor 31.

Figure 4:
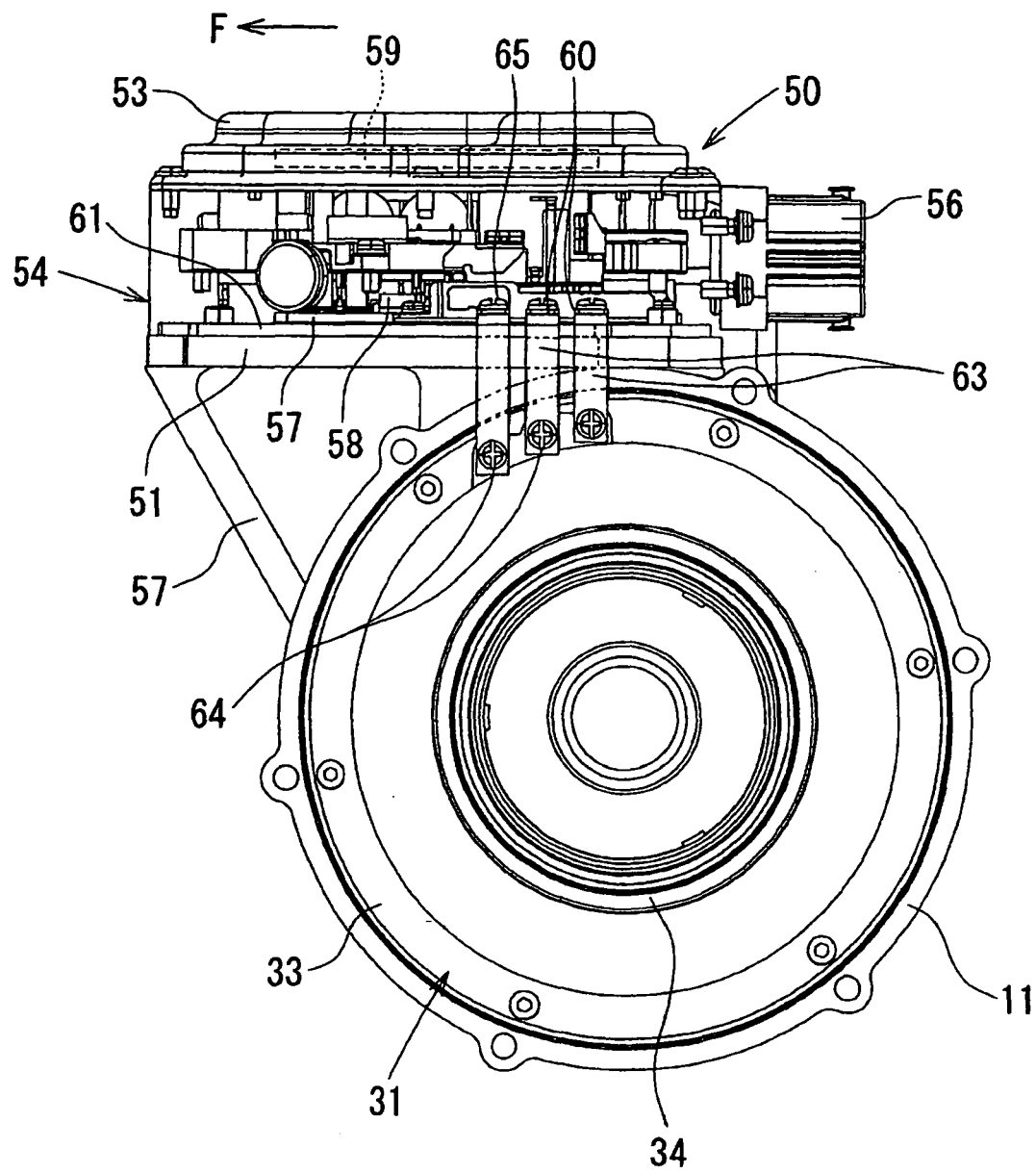
FIG. 4 is a front view and a partly sectioned view illustrating a coupling between a motor casing and an ECU in the first embodiment.
Figure 5:
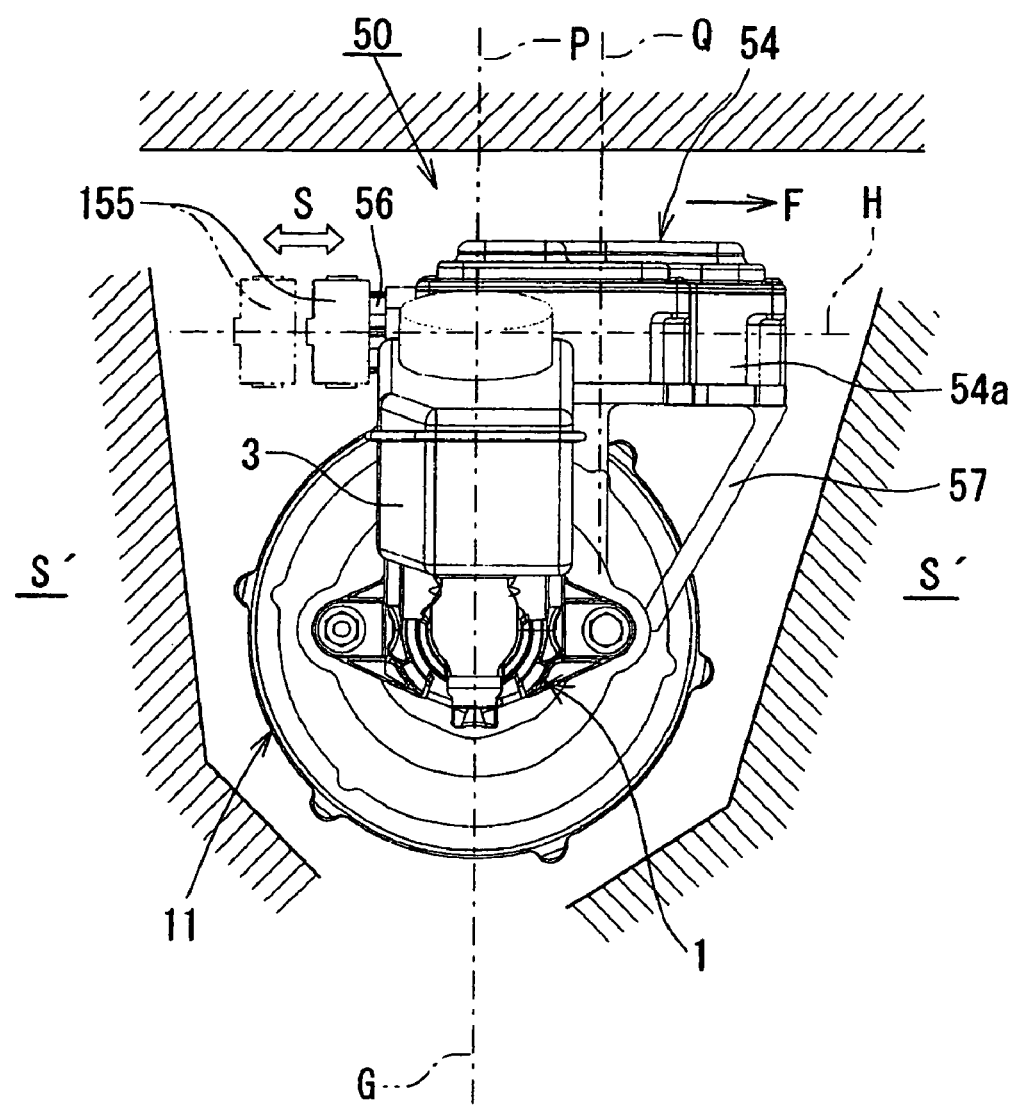
FIG. 5 is a front view illustrating the electric booster according to the first embodiment mounted onto a vehicle.

As shown in FIGS. 4 and 5, the ECU 50 comprises an ECU casing 54, which in turn comprises a box-shaped casing body 52 having a bottom plate 51, and a cover 53 covering an upper opening of the casing body 52. Overall, the ECU casing 54 has a substantially rectangle shape. A connector 56 (male connector) is provided in a protruding condition at one side surface (outer wall surface) of the ECU casing 54. The connector 56 is connected to a connector 155 (female connector) of the power supply side. The ECU casing 54 is detachably attached to the motor casing 11 while the bottom plate 51 of the ECU casing 54 is disposed on a flat portion 55 (FIGS. 1 and 3) that is formed on the top of the motor casing 11. The female connector 155 and the male connector 56 constitute an ECU connector.

The ECU casing 54 is located in a plane H perpendicular to a plane G including the axis of the master cylinder 1 (which coincides with a plane including the axis of the motor rotor 34) so as to be offset in one direction in the plane H. That is, in the positional relationship shown in FIG. 5, the plane G is a vertical plane extending in the direction of the gravitational force running through the axis of the master cylinder 1, and the plane H is a horizontal plane perpendicular to the plane G.

Regarding the positional relationship with the vehicle, the ECU casing 54 is located relative to the motor casing 11 such that a center line Q of the ECU casing 54 in the lateral direction of the vehicle and a central axis P of the motor rotor 34 are misaligned in the lateral direction of the vehicle.

In FIGS. 4 and 5, an arrow F indicates the direction in which the ECU casing 54 is offset, and the ECU casing 54 is offset in the opposite direction from the side on which the male connector 56 is provided. Therefore, the male connector 56 is disposed in a manner protruding from the ECU casing 54 in the opposite direction from the offset direction F. The motor casing 11 is provided with a support portion 57 for supporting a bottom surface of the end of the ECU casing 54 in the offset direction F side. Due to the provision of the support portion 57, the offset ECU casing 54 can be steadily supported even though a vibration or oscillation occurs, and the reliability of the electric components inside the ECU casing 54 can be improved. In the present embodiment, the ECU casing 54 is horizontally disposed relative to the front-rear direction of the vehicle. However, the ECU casing 54 may be tilted relative to the front-rear direction of the vehicle.

As shown in FIG. 5, the ECU casing 54 is offset sufficiently for securing a space (connector-attaching/detaching space) S where attachment and detachment of the female connector 155 to and from the male connector 56 are possible without the ECU casing 54 interfering or contacting with the other components and devices in the engine room R1 while the electric booster 10 is mounted on the vehicle (in the present embodiment, the ECU casing 54 is offset approximately 30 mm). In FIG. 5, the shaded area indicates an interference area S' where the ECU casing 54 may interfere or contact with the other components and devices such as a hood, a VDC unit (ABS unit) and pipes if the ECU casing 54 is disposed to enter the area S'. The sufficiently wide connector-attaching/detaching space S can be secured on the opposite side from the offset direction F side by disposing the ECU casing 54 so that the ECU casing 54 is offset as much as possible within a range such that the ECU casing 54 does not enter the interference area S' adjacent to the offset side. A concavity 54a is formed at the corner part at the end of the motor casing 11 on the offset direction F side facing the vehicle front so that the ECU casing 54 can avoid interference and contact with the other components and devices, although the concavity 54a may be formed only if such necessity arises.

The ECU casing 54 contains a power board 57 for supplying an electric current to the electric motor 31 (stator 33) in the motor casing 11, a power MOSFET 58, a control board 59 for controlling the electric motor 31, a plurality of bus bar terminals 60 and the like. Since the power board 57 generates much heat, it is disposed on the bottom plate 51 in the ECU casing 54 through a heat sink 61. Due to this configuration, the heat generated by the power board 57 is transmitted to the motor casing 11 through the bottom plate 51, whereby heat release performance can be improved. Further, electric components sensitive to heat such as the control board 59 are disposed in the upper area of the ECU casing 54 where the components can be unaffected by heat. The male connector 56 is provided with a terminal (ECU terminal) for supplying an electric current (power source) to the power board 57, a terminal for supplying a signal from the potentiometer which detects an absolute displacement of the input piston 22 to the control board 59, and the like.

A through-hole 62 (FIG. 3) is formed through the bottom plate 51 of the ECU casing 54 and the flat portion 55 of the motor casing 11 on which the ECU casing 54 is disposed, for connecting the insides of the ECU casing 54 and the motor casing 11. A plurality of bus bars 63 extend through the through-hole 62. Each bus bar 63 has one end coupled to the electric motor 31 (the stator 33) in the motor casing 11 by a screw 64, and the other end coupled to the bus bar terminal 60 in the ECU casing 54 by a screw 65. Further, a signal line 66 (FIGS. 1 and 3) also extends through the through-hole 62 for sending a detection signal of the resolver 48 (resolver stator 48a) to the control board 59 in the ECU casing 54.

The method for assembling the electric booster 10 starts with the step of providing a first sub assembly body, a second sub assembly body, a ball screw mechanism 32, a third sub assembly body, and the ECU device 50, respectively.

The first sub assembly body is constructed by installing the stator 33 of the electric motor 31, the bus bars 63, one of the bearings, i.e., bearing 36, and the stud bolt 14 into the casing body 12 of the motor casing 11.

The second sub assembly body is constructed by installing the other of the bearings, i.e., bearing 37, the rotor 34 of the electric motor 31, the resolver 48, and the stud bolt 15 onto the rear cover 13 of the motor casing 11.

The third assembly body is constructed by installing the input rod 24 and the balance springs 47 into the piston assembly 20.

The ECU device 50 is constructed by mounting the required boards (ECU boards) 57, 58 and 59 in the ECU casing 54, and attaching the male connector 56 to the ECU casing 54. It should be noted that the cover 53 of the ECU casing 54 is still not attached to the ECU casing 54 at this stage.

Firstly, the first sub assembly body and the second sub assembly body are put together to form the electric motor 31. Then, the ball screw mechanism 32 is inserted into the Electric motor 31 from the front of the casing body 12 to form the electric actuator 30. Then, the third sub assembly body is inserted through the completed electric actuator 30 from the front of the casing body 12, and the cylindrical guide 23 together with the return spring 45 and the holding spring 46 are inserted into the casing body 12. After that, the ECU device 50 is installed onto the flat surface 55 on the top of the motor casing 11. A not-shown screw is inserted through the ECU casing 54 to the inside of the casing body 12 to fix (couple) the ECU casing 54 to the motor casing 11. Due to this fixation or coupling, the upper end of the bus bar 63 having one end coupled to the stator 33 of the electric motor 31 is located adjacent to the bas bar terminal 60 in the ECU casing 54, whereby the upper end of the bus bar 63 is coupled with the bus bar terminal 60 by a screw 65. As a final step, the cover 53 is attached on the casing body 52 of the ECU casing 54 so that assembling the electric booster 10 is completed.

When the electric booster 10 is manufactured, it is required to perform tests on the electric motor 31 and the ECU unit 50 separately to confirm whether the electric motor 31 and the ECU unit 50 each correctly function, before each of them is installed. In the present embodiment, these components are first assembled as separate bodies as mentioned above, whereby the tests can be easily performed. In addition, since the ball screw mechanism 32 and the piston assembly 20 and the like can be installed into the electric motor 31 from the front of the motor casing 11, there is no need of troublesome work such as dissolving the motor casing 11 after testing the electric motor 31, and assembling the components again.

The electric booster 10 configured as mentioned above functions as follows.

When the input rod 24, i.e., the input piston 22 moves forward in response to depression of the brake pedal, this movement is detected by the potentiometer. The ECU device 50 outputs an actuation instruction to the electric motor 31 upon receiving a signal from the potentiometer, which causes a rotation of the rotor 34 of the electric motor 31. This rotation is converted into a linear motion and then transmitted to the booster piston 21 by the ball screw mechanism 32. That is, the input piston 32 and the booster piston 31 integrally move forward (thrust), and a brake fluid pressure is generated in the pressure chambers 5A and 5B in the master cylinder 10, according to an input thrust force provided to the input piston 32 by the brake pedal and a booster thrust force provided to the booster piston 21 by the electric motor 31. When the brake is actuated in this way, if the rotation of the electric motor 31 is controlled so that the relative displacement is not generated between the input piston 22 and the booster piston 21, the pair of balance spring members 47 disposed between the pistons 22 and 21 maintain their neutral positions. Since the relative displacement amount is zero, the boost ratio at this time is determined as a fixed value based on the area ratio of the pressure-receiving areas of the booster piston 21 and the input piston 22.

On the other hand, if the booster piston 21 is relatively displaced from the neutral position in a direction (front side) causing the brake fluid pressure to be increased by the booster thrust force, the boost ratio (braking force) is increased, whereby a brake assist operation by the electric motor 31 is realized. At this time, the reactive force to the brake pedal (pedal reactive force) is supposed to increase with an increase in the brake fluid pressure. However, since the urging force of the spring on the brake pedal side (rear side) of the pair of spring members 47 increases according to the above-mentioned forward relative displacement of the booster piston 21, the above-mentioned increase in the pedal reactive force is compensated for by this urging force. On the other hand, if the booster piston 21 is relatively displaced from the neutral position in a direction (rear side) causing the brake fluid pressure to be decreased by the booster thrust force, the boost ratio (braking force) is reduced, whereby a regenerative operation in regenerative braking is realized. At this time, the pedal reactive force is supposed to decrease with a decrease in the brake fluid pressure. However, since the urging force of the spring on the front side of the pair of spring members 47 increases according to the above-mentioned backward relative displacement of the booster piston 21, the above-mentioned decrease in the pedal reactive force is compensated for by this urging force. That is, as a result of adjustment of the reactive force to the brake pedal, a driver does not have discomfort or strange feeling.

In the first embodiment, since the motor housing of the electric booster and the ECU are integrally formed as one piece, they can be easily and efficiently installed onto the vehicle. However, a problem arises with such an integrated structure; that is, it would be difficult to secure a space for attaching/detaching the connecter terminal of the ECU, since contact or interference with the other devices and components in the engine room should be avoided. According to the first embodiment, the ECU casing 54 is disposed so as to be offset relative to the motor casing 11 in one direction. Therefore, as mentioned above, a space (connecter attaching/detaching space) S having a sufficient width for attaching/detaching the female connector 55 to/from the male connector 56 can be secured on the opposite side from the offset direction F side (refer to FIG. 5). As a result, even with integration of the ECU 50 and the motor casing 11, the connecter attaching/detaching space S can be readily secured without worrying about contact and interference with the other devices and components in the vicinity.

Further, the overall installation space including the connector attaching/detaching space S is substantially symmetrical in the lateral direction of the vehicle relative to the center line running through the axis of the master cylinder 1 (refer to FIG. 5). Therefore, the present embodiment can be employed without modification for either of a left-hand drive car or a right-hand drive car regardless of difference of the installation space, and therefore the utility value can be improved.

Further, since the bus bar terminal 60 in the ECU casing 54 is disposed adjacent the side surface on which the male connecter 56 is provided, it is possible to reduce the distance between the connector 56 and the end of the bus bar 63 where the bus bar 63 is connected to the electric motor 31. Therefore, energy loss can be reduced. In addition, as shown in FIG. 1, since a part of the ECU casing 54 is disposed over, i.e., overlaps a part of the reservoir 3 of the master cylinder 1, this leads to a reduction in overall size of the electric booster so that the booster can be easily and efficiently installed onto the vehicle.

Figure 6:
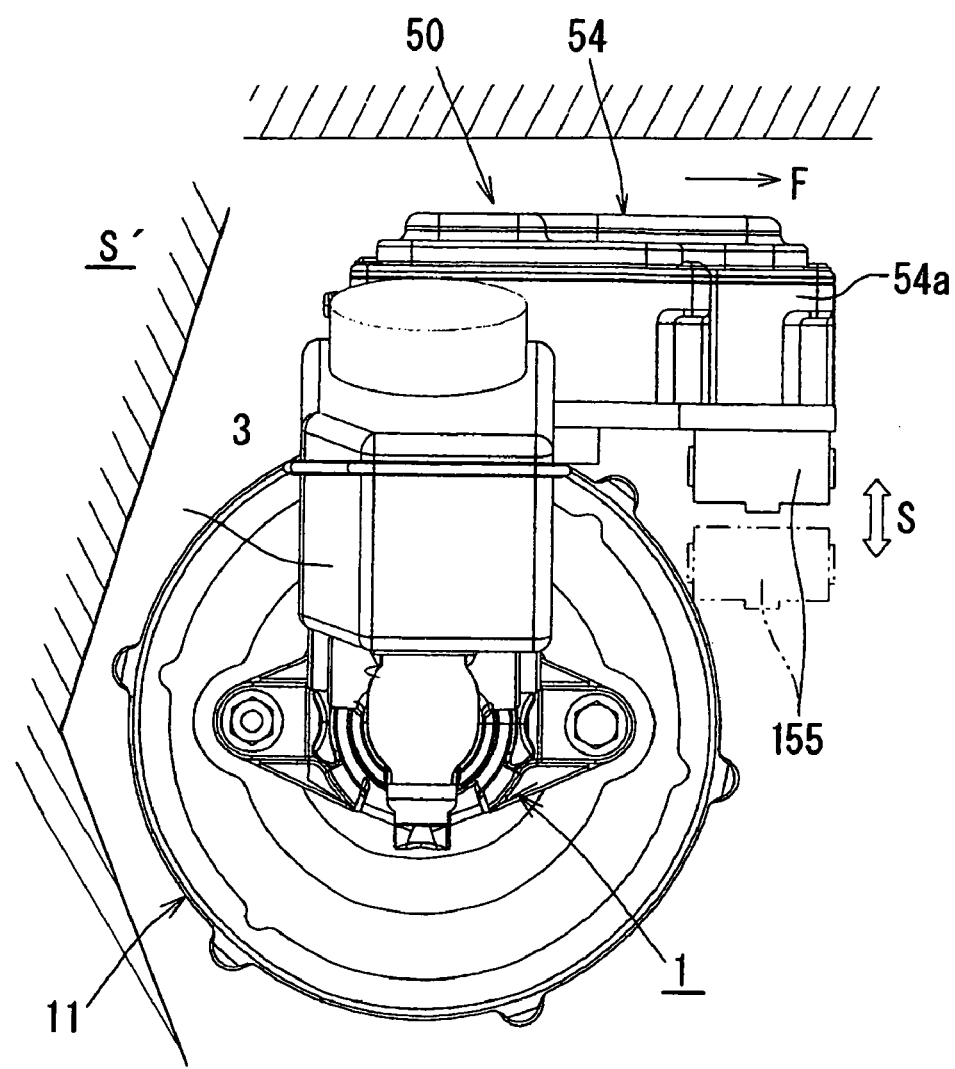
FIG. 6 is a front view illustrating a variation of the electric booster according to the first embodiment.

In the first embodiment, the male connecter 56 is disposed on the surface of the opposite side from the offset direction F side of the ECU casing 54. However, as shown in FIG. 6, the male connector 56 (connector attaching/detaching space S) may be disposed under the end of the offset direction F side of the ECU casing 54 (FIG. 6 only shows the other connector, i.e., the female connector 155).

In this case, if there is no enough space between the interference area S' and the opposite side of the ECU casing 54 from the offset direction F side, the present embodiment can be employed. In addition, due to disposing the male connector 56 under the end of the offset direction F side of the ECU casing 54, it is possible to effectively prevent rain or fluid from entering the ECU connector, for example, compared to an ECU casing including the connector disposed on the top of the casing end.

Figure 7:
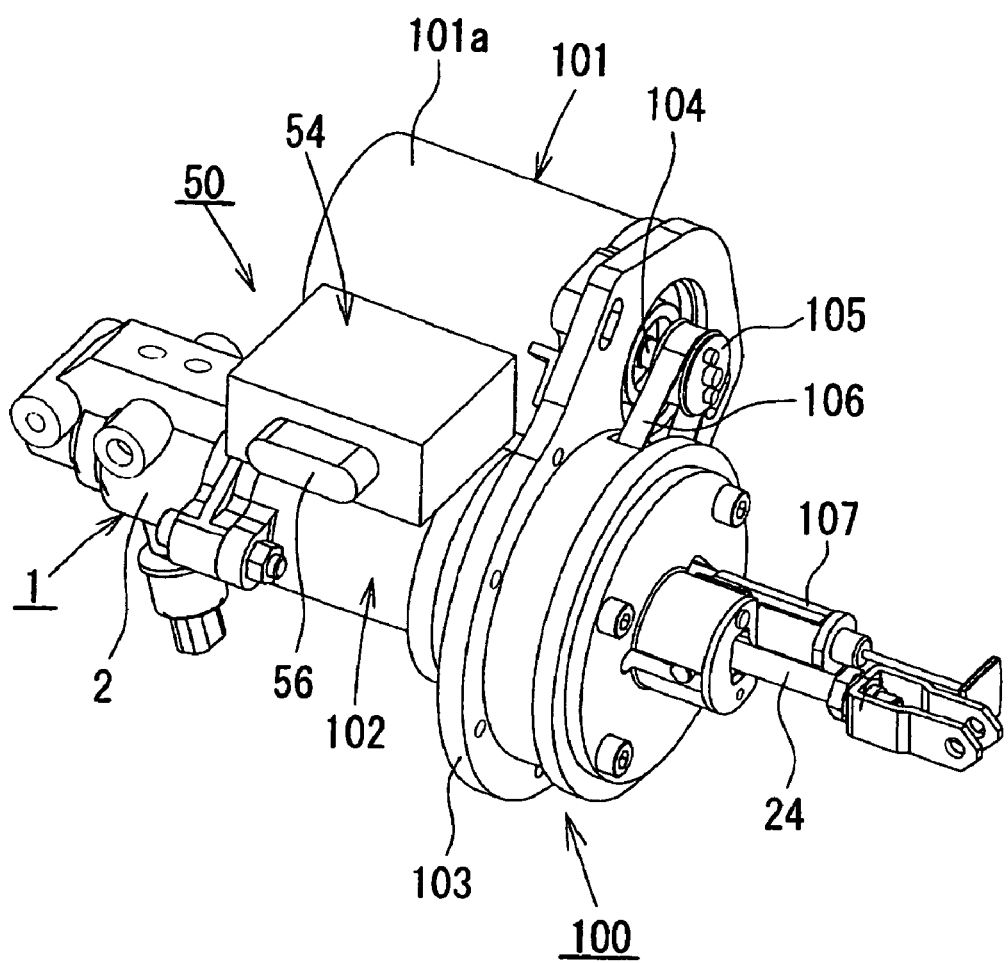
FIG. 7 is a perspective view illustrating an overall structure of an electric booster according to a second embodiment of the present invention.
Figure 8:
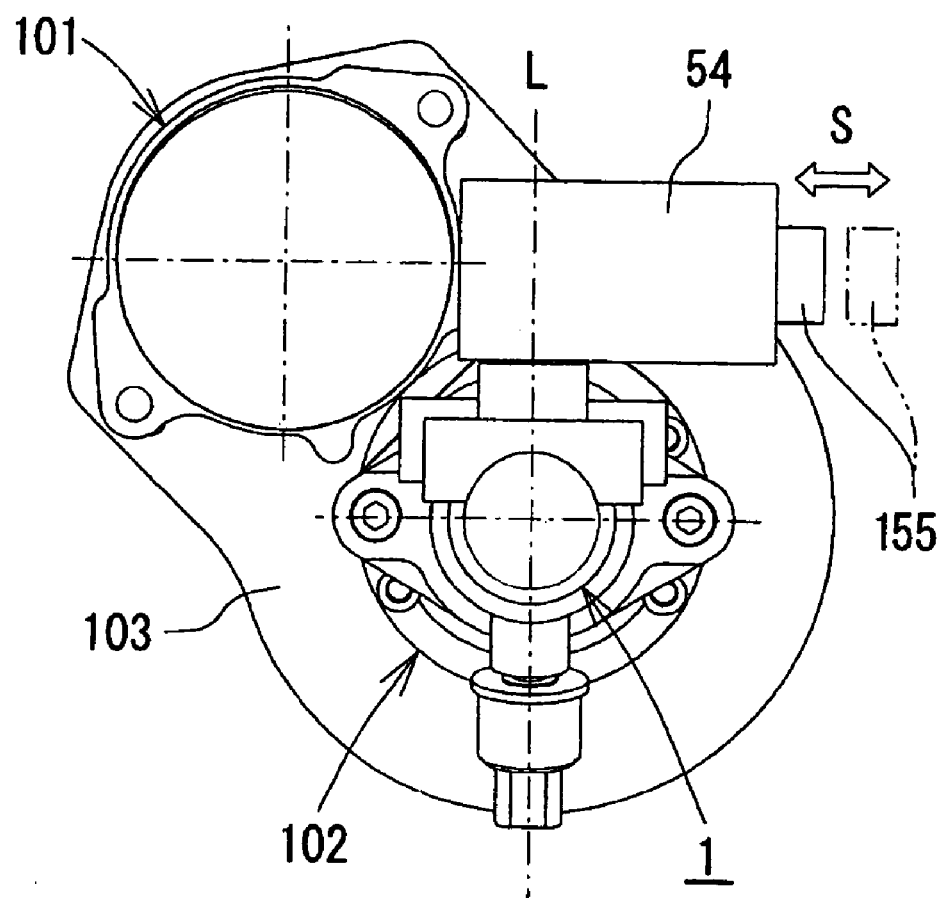
FIG. 8 is a front view illustrating the overall structure of the electric booster according to the second embodiment.

FIGS. 7 and 8 illustrate an overall structure of an electric booster according to a second embodiment of the present invention. In an electric booster 100 as the second embodiment, an electric motor (DC brushless motor) 101 is provided separately from a casing (booster casing) 102 containing the piston assembly 20, the ball screw mechanism (rotation-linear motion converting mechanism) 32, the balance springs 47, and the like. The electric motor 101 and the booster casing 102 are placed in parallel with each other. The electric motor 101 is supported by a support plate 103 integrally formed with the booster casing 102. Rotation (moving force) of the electric motor 101 is transmitted through a driving pulley 105 attached to an output shaft 104 of the electric motor 101, a driven pulley (not shown) attached to the nut member 39 (refer to FIG. 3) of the ball screw mechanism 32, and a belt 106 hung around the both pulleys. In FIG. 7, reference numeral 107 denotes a potentiometer for detecting an absolute displacement of the input piston 22. Further, in the electric booster 100, a rotation sensor (resolver) for detecting an absolute displacement of the booster piston 21 is contained in a casing 101a of the electric motor 101.

In the second embodiment, the electric motor 101 is disposed so as to be offset in one direction (horizontally) from a center line L extending in the vertical direction of the master cylinder 1. On the other hand, the ECU casing 54 coupled to the outer surface of the casing 101a of the electric motor 101 is disposed so as to be offset from the center line L in the opposite direction from the direction in which the electric motor 101 is offset. The ECU connecter (FIG. 8 only shows the female connector 55) is provided on one side surface of the ECU casing 54 on the offset direction side. The overall installation space including the connector attaching/detaching space S is substantially symmetrical in the vehicle lateral direction relative to the center line L of the master cylinder 1. Therefore, the electric booster 100 in the second embodiment, as in the first embodiment, can be employed regardless of left-hand or right-hand drive car.

In the present embodiment, the ECU casing 54 and the outer surface of the casing 101a of the electric motor 101 may be directly coupled with each other, or may be indirectly coupled with each other by coupling the casing 101a of the electric motor 101 and the ECU casing 54 with the booster casing 102, respectively.

In the above described embodiments, the booster piston (output member) 21 actuated by the electric motor 31, 101 also serves as the primary piston of the tandem master cylinder 1. However, the output member 21 may be provided as a separate body from the piston in the master cylinder. Further, in the above-mentioned embodiments, the male connector 56 is provided at the ECU casing 54. However, instead, the female connector 155 may be provided at the ECU casing 54.

According to the electric boosters in the above-discussed embodiments, the ECU and the motor casing can be integrally provided so that they can be easily and efficiently installed onto the vehicle. In addition, it is possible to reduce interference and contact with the other devices and components in the engine room, so that the utility value can be improved.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The present application claims priority under 35 U.S.C. section 119 to Japanese Patent Application No. 2008-021645, filed on Jan. 31, 2008.

The entire disclosure of Japanese Patent Application No. 2008-021645 filed on Jan. 31, 2008 including specification, claims, drawings and summary is incorporated herein by reference in its entirety.

What is claimed is:

1. An electric booster, comprising:
    an electric motor adapted to be actuated in response to an actuation instruction;
    a rotation-linear motion converting mechanism operable to convert a rotation of the electric motor into a linear motion and transmit it to an output member, the output member being capable of pushing a piston of a master cylinder to generate a brake fluid pressure in a pressure chamber in the master cylinder;
    an ECU casing containing a board for controlling the electric motor, the ECU casing being formed integrally with a motor casing of the electric motor, the ECU casing being coupled with the motor casing so as to be offset in one direction in a plane perpendicular to a plane containing an axis of the master cylinder; and
    a connector for supplying at least a power source to the board, the connector being provided at an end of the ECU casing on the side where the ECU casing is offset, or an opposite side from the side where the ECU casing is offset.

2. The electric booster according to claim 1, wherein the ECU casing is sufficiently offset for securing a space around the connecter, so that an associated connector can be removably attached to the connector.

3. The electric booster according to claim 2, wherein the connector is formed in a manner protruding from the ECU casing in an opposite direction from the direction in which the ECU casing is offset.

4. The electric booster according to claim 2, wherein the connector is formed in a manner protruding from the ECU casing in the direction in which the ECU casing is offset.

5. The electric booster according to claim 1, wherein the motor casing has a cylindrical shape, and comprises a support portion for supporting an end of the offset side of the ECU casing.

6. The electric booster according to claim 1, wherein the master cylinder includes a reservoir containing brake fluid, and the ECU casing is partly disposed over the reservoir.

7. The electric booster according to claim 1, wherein the rotation-linear motion converting mechanism is disposed in the motor casing.

8. An electric booster, comprising:
    an electric motor adapted to be actuated in response to an actuation instruction;
    a rotation-linear motion converting mechanism operable to convert a rotation of the electric motor into a linear motion and transmit it to an output member, the output member capable of pushing a piston of a master cylinder to generate a brake fluid pressure in a pressure chamber in the master cylinder, and supply the generated brake fluid pressure into a wheel cylinder;
    the electric motor comprising a stator including a plurality of coils, a rotor connected with the rotation-linear motion converting mechanism and adapted to rotate by application of an electric current to the stator, and a motor casing containing the stator and the rotor; and
    an ECU casing containing a board for controlling the electric motor, the ECU casing being coupled to an outer surface of the motor casing and disposed above the master cylinder so as to be offset in one direction in a plane perpendicular to a plane including an axis of the master cylinder, a connector for supplying at least a power source to the board being provided at an end of the ECU casing on the side where the ECU casing is offset, or an opposite side from the side where the ECU casing is offset.

9. The electric booster according to claim 8, wherein the ECU casing is sufficiently offset for securing a space around the connecter, so that an associated connector can be removably attached to the connector.

10. The electric booster according to claim 9, wherein the connector is formed in a manner protruding from the ECU casing in an opposite direction from the direction in which the ECU casing is offset.

11. The electric booster according to claim 9, wherein the connector is formed in a manner protruding from the ECU casing in the direction in which the ECU casing is offset.

12. The electric booster according to claim 8, wherein the motor casing has a cylindrical shape, and comprises a support portion for supporting an end of the offset side of the ECU casing.

13. The electric booster according to claim 8, wherein the master cylinder includes a reservoir containing brake fluid, and the ECU casing is partly disposed over the reservoir.

14. The electric booster according to claim 8, wherein the rotation-linear motion converting mechanism is disposed in the motor casing.

15. An electric booster comprises:
    an electric motor adapted to be actuated in response to an actuation instruction; and
    a rotation-linear motion converting mechanism operable to convert a rotation of the electric motor into a linear motion and transmit it to an output member,
    the output member being able to push a piston of a master cylinder to generate a brake fluid pressure in a pressure chamber in the master cylinder,
    the electric motor comprises a stator including a plurality of coils, a rotor adapted to rotate by application of an electric current to the stator, and a motor casing containing the stator, the rotor, and the rotation-linear motion converting mechanism,
    the electric booster further comprises an ECU casing containing a board for controlling the electric motor, the ECU casing being coupled to an outer surface of the motor casing, the motor casing and the ECU casing being disposed so that a center axis of the rotor and a center line of the ECU casing in a vehicle lateral direction are misaligned in the vehicle lateral direction, a connector for supplying at least a power source being provided at an end of the ECU casing, the end facing a space made due to misalignment between the motor casing and the ECU casing.

16. The electric booster according to claim 15, wherein the space is sufficiently wide so that an associated connector can be removably attached to the connector.

17. The electric booster according to claim 15, wherein the motor casing has a cylindrical shape, and comprises a support portion for supporting an end of the offset side of the ECU casing.

18. The electric booster according to claim 15, wherein the space is made on an opposite side of the ECU casing from the direction in which the ECU casing is offset, and the connector is provided on a surface of the opposite side of the ECU casing.

19. The electric booster according to claim 15, wherein the space is made below the end of the ECU casing, and the connector is provided on the lower end side of the ECU casing.

* * * * *